(12) United States Patent
Oshima

(10) Patent No.: US 8,445,583 B2
(45) Date of Patent: May 21, 2013

(54) CONJUGATED DIENE POLYMER, CONJUGATED DIENE POLYMER COMPOSITION, AND METHOD FOR PRODUCING CONJUGATED DIENE POLYMER

(75) Inventor: Mayumi Oshima, Bartlesville, OK (US)

(73) Assignee: Sumitomo Chemical Company, Limited, Tokyo (JP)

( * ) Notice: Subject to any disclaimer, the term of this patent is extended or adjusted under 35 U.S.C. 154(b) by 4 days.

(21) Appl. No.: 13/430,140

(22) Filed: Mar. 26, 2012

(65) Prior Publication Data

US 2012/0184667 A1     Jul. 19, 2012

Related U.S. Application Data

(62) Division of application No. 12/546,337, filed on Aug. 24, 2009.

(30) Foreign Application Priority Data

Aug. 27, 2008 (JP) ................... 2008-217835

(51) Int. Cl.
*B60C 1/00* (2006.01)
*C08L 9/00* (2006.01)

(52) U.S. Cl.
USPC ........... 524/571; 524/572; 524/535; 525/288; 525/331.9; 525/102

(58) Field of Classification Search
USPC ............... 524/572, 535, 571; 525/288, 331.9, 525/102
See application file for complete search history.

(56) References Cited

U.S. PATENT DOCUMENTS

| | | | |
|---|---|---|---|
| 4,661,561 A * | 4/1987 | Abolins et al. | 525/68 |
| 5,189,109 A * | 2/1993 | Imai et al. | 525/296 |
| 5,811,479 A | 9/1998 | Labauze | |
| 2005/0131181 A1 | 6/2005 | Halasa et al. | |
| 2005/0203251 A1 | 9/2005 | Oshima et al. | |

FOREIGN PATENT DOCUMENTS

| | | |
|---|---|---|
| EP | 0334042 A2 | 9/1989 |
| EP | 1449857 A1 | 8/2004 |
| EP | 1661946 A1 | 5/2006 |
| JP | 63-186748 A | 8/1988 |
| JP | 01-217047 A | 8/1989 |
| JP | 01-217048 A | 8/1989 |
| JP | 2005-290355 A | 10/2005 |

OTHER PUBLICATIONS

Hungarian Search Report issued in corresponding App. No. 2009/055963 dated Jan. 21, 2010.

* cited by examiner

*Primary Examiner* — James J Seidleck
*Assistant Examiner* — Deve E Valdez
(74) *Attorney, Agent, or Firm* — Sughrue Mion, PLLC

(57) ABSTRACT

A conjugated diene polymer is provided that comprises a conjugated diene-based constituent unit and a constituent unit of formula (I) below, at least one terminus of the polymer being modified by a compound having a linkage of formula (II) below.

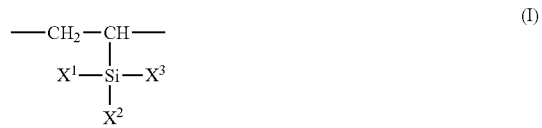

wherein $X^1$, $X^2$, and $X^3$ independently denote a group as defined in the specification.

7 Claims, No Drawings

CONJUGATED DIENE POLYMER, CONJUGATED DIENE POLYMER COMPOSITION, AND METHOD FOR PRODUCING CONJUGATED DIENE POLYMER

This is a divisional Application of Ser. No. 12/546,337, filed Aug. 24, 2009, which claims the priority of Japanese Appln. No. 2008-217835 filed Aug. 27, 2008, the disclosures of which are hereby totally incorporated by reference.

TECHNICAL FIELD

The present invention relates to a conjugated diene polymer, a conjugated diene polymer composition, and a method for producing a conjugated diene polymer.

BACKGROUND ART

In recent years, with the growing concern over environmental problems the demand for good fuel economy for automobiles has been becoming stronger, and there is also a demand for excellent fuel economy for polymer compositions used for automobile tires. As a polymer composition for automobile tires, a polymer composition comprising a conjugated diene polymer such as polybutadiene or a butadiene-styrene copolymer and a filler such as carbon black or silica, etc. is used.

For example, a polymer composition employing as the conjugated diene polymer a polymer formed by modifying with bis(dimethylamino)methylvinylsilane one terminus of a polymer formed by copolymerizing butadiene and styrene using an alkyllithium as a polymerization initiator (see e.g. JP-A-1-217048) is known. Furthermore, a polymer composition employing as the conjugated diene polymer a polymer formed by modifying with a dialkylamino group-containing acrylamide one terminus of a polymer formed by copolymerizing butadiene and styrene using an alkyllithium as a polymerization initiator (see e.g. JP-A-1-217047), a polymer composition employing as the conjugated diene polymer a polymer formed by modifying with a dialkylamino group-containing alkoxysilane one terminus of a polymer formed by polymerizing butadiene or copolymerizing butadiene and styrene, using an alkyllithium as a polymerization initiator (see e.g. JP-A-63-186748, JP-A-2005-290355), etc. have been proposed as polymer compositions having good fuel economy.

DISCLOSURE OF THE INVENTION

However, the above-mentioned conventional polymer compositions employing a conjugated diene polymer are not always satisfactory in terms of fuel economy.

Under such circumstances, an object of the present invention is to provide a conjugated diene polymer that can give a polymer composition having excellent fuel economy, a polymer composition formed by combining the conjugated diene polymer and a filler such as silica, and a method for producing the conjugated diene polymer.

A first aspect of the present invention relates to a conjugated diene polymer comprising a conjugated diene-based constituent unit and a constituent unit of formula (I) below, at least one terminus of the polymer being modified by a compound having a linkage of formula (II) below,

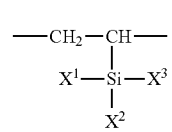

(I)

wherein $X^1$, $X^2$, and $X^3$ independently denote a group of formula (Ia) below, a hydroxy group, a hydrocarbyl group, or a substituted hydrocarbyl group, and at least one of $X^1$, $X^2$, and $X^3$ is a group of formula (Ia) below or a hydroxy group,

(Ia)

wherein $R^1$ and $R^2$ independently denote a hydrocarbyl group having 1 to 6 carbon atoms, a substituted hydrocarbyl group having 1 to 6 carbon atoms, a silyl group, or a substituted silyl group, and $R^1$ and $R^2$ may be bonded so as to form, together with the nitrogen atom, a ring structure

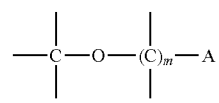

(II)

wherein m denotes an integer of 1 to 10, and A denotes a nitrogen atom-containing functional group.

A second aspect of the present invention relates to a conjugated diene polymer composition comprising the above-mentioned conjugated diene polymer and a filler.

A third aspect of the present invention relates to a method for producing a conjugated diene polymer, comprising steps A and B:

step A: polymerizing monomers comprising a conjugated diene and a vinyl compound of formula (IV) below in a hydrocarbon solvent by an alkali metal catalyst to produce a polymer having an alkali metal originating from the catalyst at least one terminus of a polymer chain comprising a conjugated diene-based monomer unit and a monomer unit based on the vinyl compound of formula (IV) below,

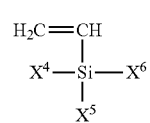

(IV)

wherein $X^4$, $X^5$, and $X^6$ independently denote a group of formula (IVa) below, a hydrocarbyl group, or a substituted hydrocarbyl group, and at least one of $X^4$, $X^5$, and $X^6$ is a croup of formula (IVa) below.

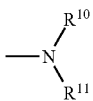

(IVa)

wherein $R^{10}$ and $R^{11}$ independently denote a hydrocarbyl group having 1 to 6 carbon atoms, a substituted hydrocarbyl group having 1 to 6 carbon atoms, a silyl group, or a substituted silyl group, and $R^{10}$ and $R^{11}$ may be bonded so as to form, together with the nitrogen atom, a ring structure]; and step B: reacting the resulting polymer in step A with a compound having a linkage of formula (II) below

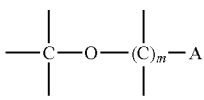

(II)

wherein m denotes an integer of 1 to 10, and A denotes a nitrogen atom-containing functional group.

MODE FOR CARRYING OUT THE INVENTION

The conjugated diene polymer of the present invention is a conjugated diene polymer having a conjugated diene-based constituent unit and a constituent unit of formula (I) below, at least one terminus of the polymer being modified by a compound having a linkage of formula (II) below,

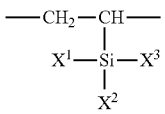

(I)

wherein $X^1$, $X^2$, and $X^3$ independently denote a group of formula (Ia) below, a hydroxy group, a hydrocarbyl group, or a substituted hydrocarbyl group, and at least one of $X^1$, $X^2$, and $X^3$ is a hydroxy group or a group of formula (Ia):

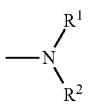

(Ia)

wherein $R^1$ and $R^2$ independently denote a hydrocarbyl group having 1 to 6 carbon atoms, a substituted hydrocarbyl group having 1 to 6 carbon atoms, a silyl group, or a substituted silyl group, and $R^1$ and $R^2$ may be bonded so as to form, together with the nitrogen atom, a ring structure,

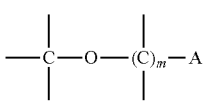

(II)

wherein m denotes an integer of 1 to 10, and A denotes a nitrogen atom-containing functional group.

Examples of the conjugated diene-based constituent unit include 1,3-butadiene, isoprene, 1,3-pentadiene, 2,3-dimethyl-1,3-butadiene, and 1,3-hexadiene, and one type thereof may be used or two or more types may be used. From the viewpoint of ready availability, 1,3-butadiene and isoprene are preferable.

$X^1$, $X^2$, and $X^3$ of the constituent unit of formula (I) independently denote a group of formula (Ia), a hydroxy group, a hydrocarbyl group, or a substituted hydrocarbyl group, and at least one of $X^1$, $X^2$, and $X^3$ is a group of formula (Ia) or a hydroxy group.

$R^1$ and $R^2$ in Formula (Ia) independently denote a hydrocarbyl group having 1 to 6 carbon atoms, a substituted hydrocarbyl group having 1 to 6 carbon atoms, a silyl group, or a substituted silyl group, and $R^1$ and $R^2$ may be bonded so as to form, together with the nitrogen atom, a ring structure.

In the present specification, the hydrocarbyl group denotes a hydrocarbon residue. The substituted hydrocarbyl group denotes a group in which at least one hydrogen atom of the hydrocarbon residue is replaced by a substituent. The hydrocarbyloxy group denotes a group in which the hydrogen atom of a hydroxy group is replaced by a hydrocarbyl group, and the substituted hydrocarbyloxy group denotes a group in which at least one hydrogen atom of a hydrocarbyloxy group is replaced by a substituent. The substituted silyl group denotes a group in which at least one hydrogen atom of a silyl group is replaced by a substituent.

Examples of the hydrocarbyl group having 1 to 6 carbon atoms denoted by $R^1$ and $R^2$ include an alkyl group such as a methyl group, an ethyl group, an n-propyl group, an isopropyl group, an n-butyl group, a sec-butyl group, a tert-butyl group, an n-pentyl group, a neopentyl group, an isopentyl group, or an n-hexyl group; a cycloalkyl group such as a cyclohexyl group; and a phenyl group.

Examples of the substituted hydrocarbyl group having 1 to 6 carbon atoms denoted by $R^1$ and $R^2$ include a substituted hydrocarbyl group having as a substituent at least one type of group selected from the group consisting of a nitrogen atom-containing group, an oxygen atom-containing group, and a silicon atom-containing group. Examples of a group having a nitrogen atom-containing group as a substituent include a dialkylaminoalkyl group such as a dimethylaminoethyl group or a diethylaminoethyl group, examples of a group having an oxygen atom-containing group as a substituent include an alkoxyalkyl group such as a methoxymethyl group, a methoxyethyl group, an ethoxymethyl group, or an ethoxyethyl group, and examples of a group having a silicon atom-containing group as a substituent include a trialkylsilylalkyl group such as a trimethylsilylmethyl group.

Examples of the substituted silyl group denoted by $R^1$ and $R^2$ include a trialkylsilyl group such as a trimethylsilyl group, a triethylsilyl group, or a t-butyldimethylsilyl group.

As a group in which $R^1$ and $R^2$ are bonded, a divalent group having 1 to 12 carbon atoms, which may have at least one type of atom selected from the atomic group consisting of a nitrogen atom, an oxygen atom, and a silicon atom, can be cited. Examples thereof include an alkylene group such as a trimethylene group, a tetramethylene group, a pentamethylene group, or a hexamethylene group; an oxydialkylene group such as an oxydiethylene group or an oxydipropylene group; and a nitrogen-containing group such as a group represented by —$CH_2CH_2$—NH—$CH_2$— or a group represented by —$CH_2CH_2$—N=CH—.

The group in which $R^1$ and $R^2$ are bonded is preferably a nitrogen-containing group, and more preferably a group represented by —$CH_2CH_2$—NH—$CH_2$— or a group represented by —$CH_2CH_2$—N=CH—.

The hydrocarbyl group denoted by $R^1$ and $R^2$ is preferably an alkyl group, more preferably an alkyl group having 1 to 4 carbon atoms, yet more preferably a methyl group, an ethyl group, an n-propyl group, or an n-butyl group, and particularly preferably an ethyl group or an n-butyl group. The substituted hydrocarbyl group denoted by $R^1$ and $R^2$ is preferably an alkoxyalkyl group, and more preferably an alkoxyalkyl group having 1 to 4 carbon atoms. The substituted silyl group denoted by $R^1$ and $R^2$ is preferably a trialkylsilyl group, and more preferably a trimethylsilyl group.

$R^1$ and $R^2$ are preferably an alkyl group, an alkoxyalkyl group, a substituted silyl group, or a nitrogen-containing group in which $R^1$ and $R^2$ are bonded, more preferably an alkyl group, yet more preferably an alkyl group having 1 to 4 carbon atoms, and still more preferably a methyl group, an ethyl group, an n-propyl group, or an n-butyl group.

Examples of the group of formula (Ia) include an acyclic amino group and a cyclic amino group.

Examples of the acyclic amino group include a dialkylamino group such as a dimethylamino group, a diethylamino group, a di(n-propyl)amino group, a di(isopropyl)amino group, a di(n-butyl)amino group, a di(sec-butyl)amino group, a di(tert-butyl)amino group, a di(neopentyl)amino group, or an ethylmethylamino group; a di(alkoxyalkyl)amino group such as a di(methoxymethyl)amino group, a di(methoxyethyl)amino group, a di(ethoxymethyl)amino group, or a di(ethoxyethyl)amino group; and a di(trialkylsilyl)amino group such as a di(trimethylsilyl)amino group or a di(t-butyldimethylsilyl)amino group.

Examples of the cyclic amino group include a 1-polymethyleneimino group such as a 1-pyrrolidinyl group, a 1-piperidino group, a 1-hexamethyleneimino group, a 1-heptamethyleneimino group, a 1-octamethyleneimino group, a 1-decamethyleneimino group, or a 1-dodecamethyleneimino group. Further examples of the cyclic amino group include a 1-imidazolyl group, a 4,5-dihydro-1-imidazolyl group, a 1-imidazolidinyl group, a 1-piperazinyl group, and a morpholine group.

From the viewpoint of economy and ready availability, the group of formula (Ia) is preferably an acyclic amino group, more preferably a dialkylamino group, yet more preferably a dialkylamino group substituted with an alkyl group having 1 to 4 carbon atoms, and still more preferably a dimethylamino group, a diethylamino group, a di(n-propyl)amino group, or a di(n-butyl)amino group.

Examples of the hydrocarbyl group denoted by $X^1$ to $X^3$ of Formula (I) include an alkyl group such as a methyl group, an ethyl group, an n-propyl group, an isopropyl group, an n-butyl group, a sec-butyl group, or a tert-butyl group. Furthermore, examples of the substituted hydrocarbyl group include an alkoxyalkyl group such as a methoxymethyl group, an ethoxymethyl group, a methoxyethyl group, or an ethoxyethyl group.

The hydrocarbyl group denoted by $X^1$ to $X^3$ is preferably an alkyl group, more preferably an alkyl group having 1 to 4 carbon atoms, and yet more preferably a methyl group or an ethyl group. Furthermore, the substituted hydrocarbyl group denoted by $X^1$ to $X^3$ is preferably an alkoxyalkyl group, and more preferably an alkoxyalkyl group having 1 to 4 carbon atoms.

The hydrocarbyl group or substituted hydrocarbyl group denoted by $X^1$ to $X^3$ is preferably an alkyl group or an alkoxyalkyl group, more preferably an alkyl group having 1 to 4 carbon atoms or an alkoxyalkyl group having 1 to 4 carbon atoms, yet more preferably an alkyl group having 1 to 4 carbon atoms, and still more preferably a methyl group or an ethyl group.

At least one of $X^1$, $X^2$, and $X^3$ of Formula (I) is a group of formula (Ia) or a hydroxy group. It is preferable that two or more of $X^1$, $X^2$, and $X^3$ are a group of formula (Ia) or a hydroxy group, and it is more preferable that two of $X^1$, $X^2$, and $X^3$ are a group of formula (Ia) or a hydroxy group.

Examples of the constituent unit of formula (I) include a vinyl compound-based constituent unit of formula (IV), which is described later. It is preferably a vinyl compound-based constituent unit of formula (IV) in which two of $X^4$, $X^5$, and $X^6$ are acylic amino groups, and from the viewpoint of fuel economy and grip properties is more preferably a bis(dialkylamino)alkylvinylsilane-based constituent unit, and yet more preferably a bis(dimethylamino)methylvinylsilane-based constituent unit, a bis(diethylamino)methylvinylsilane-based constituent unit, a bis(di(n-propyl)amino)methylvinylsilane-based constituent unit, or a bis(di(n-butyl)amino)methylvinylsilane-based constituent unit. Among them, from the viewpoint of ready availability of the compound, a bis(diethylamino)methylvinylsilane-based constituent unit and a bis(di(n-butyl)amino)methylvinylsilane-based constituent unit are preferable.

From the viewpoint of fuel economy and grip properties, the content of the constituent unit of formula (I) in the conjugated diene polymer, per unit weight of the polymer, is preferably not less than 0.001 mmol/g of polymer and not more than 0.1 mmol/g of polymer, more preferably not less than 0.002 mmol/g of polymer and not more than 0.07 mmol/g of polymer, and yet more preferably not less than 0.003 mmol/g of polymer and not more than 0.05 mmol/g of polymer.

The conjugated diene polymer of the present invention is a polymer having at least one terminus of the polymer modified with a compound having a linkage of formula (II):

(II)

wherein m denotes an integer of 1 to 10, and A denotes a nitrogen atom-containing functional group.

m denotes an integer of 1 to 10. From the viewpoint of fuel economy being enhanced, it is preferably not less than 1, and from the viewpoint of economy during production being enhanced, it is preferably not more than 4. A is a nitrogen atom-containing functional group, and examples thereof include an amino group, an isocyano group, a cyano group, a pyridyl group, a piperidyl group, a pyrazyl group, and a morpholino group.

Examples of the compound having a linkage of formula (II) include a compound of formula (III) below.

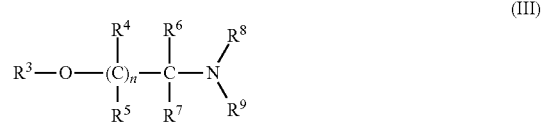

(III)

wherein n denotes an integer of 0 to 10, $R^3$ denotes a hydrocarbyl group having 1 to 5 carbon atoms, $R^4$, $R^5$, $R^6$, and $R^7$ independently denote a hydrogen atom, a hydrocarbyl group having 1 to 5 carbon atoms, a substituted hydrocarbyl group having 1 to 5 carbon atoms, or a hydrocarbyloxy group having 1 to 5 carbon atoms, when there are a plurality of $R^4$s and $R^5$s the plurality of $R^4$s and the plurality of $R^5$s may be identical to or different from each other, $R^8$ and $R^9$ independently denote a group having 1 to 6 carbon atoms, which may have at least one type of atom selected from the atomic group consisting of a nitrogen atom, an oxygen atom, and a silicon atom, $R^8$ and $R^9$ may be bonded so as to form, together with the nitrogen atom, a ring structure, and $R^8$ and $R^9$ may be a single group bonded to the nitrogen via a double bond.

n in Formula (III) denotes an integer of 1 to 10. From the viewpoint of improving economy it is preferably not more than 3, and more preferably 0.

$R^3$ in Formula (III) denotes hydrocarbyl group having 1 to 5 carbon atoms. Examples of the hydrocarbyl group includes an alkyl group such as a methyl group, an ethyl group, an n-propyl group, an isopropyl group, an n-butyl group, a sec-butyl group, a t-butyl group.

The hydrocarbyl group denoted $R^3$ is preferably an alkyl group, more preferably an alkyl group having 1 to 4 carbon atoms, and yet more preferably a methyl group or an ethyl group.

$R^4$ to $R^7$ in Formula (III) independently denote a hydrogen atom, a hydrocarbyl group having 1 to 5 carbon atoms, a substituted hydrocarbyl group having 1 to 5 carbon atoms, or a hydrocarbyloxy group having 1 to 5 carbon atoms, and when there are a plurality of $R^4$s and $R^5$s the plurality of $R^4$s and the plurality of $R^5$s may be identical to or different from each other.

Examples of the hydrocarbyl group denoted by $R^4$ to $R^7$ include an alkyl group such as a methyl group, an ethyl group, an n-propyl group, an isopropyl group, an n-butyl group, a sec-butyl group, or a t-butyl group.

Examples of the substituted hydrocarbyl group denoted by $R^4$ to $R^7$ include a substituted hydrocarbyl group having as a substituent at least one type of group selected from the group consisting of a nitrogen atom-containing group and an oxygen atom-containing group. Examples of a group having a nitrogen atom-containing group as a substituent include a dialkylaminoalkyl group such as a dimethylaminoethyl group or a diethylaminoethyl group, and examples of a group having an oxygen atom-containing group as a substituent include an alkoxyalkyl group such as a methoxymethyl group, a methoxyethyl group, an ethoxymethyl group, or an ethoxyethyl group.

Examples of the hydrocarbyloxy group denoted by $R^4$ to $R^7$ include an alkoxy group such as a methoxy group, an ethoxy group, an n-propoxy group, an isopropoxy group, an n-butoxy group, a sec-butoxy group, or a t-butoxy group.

The hydrocarbyl group denoted by $R^4$ to $R^7$ is preferably an alkyl group, more preferably an alkyl group having 1 to 4 carbon atoms, and yet more preferably a methyl group or an ethyl group.

The substituted hydrocarbyl group denoted by $R^4$ to $R^7$ is preferably an alkoxyalkyl group, more preferably an alkoxyalkyl group having 1 to 4 carbon atoms, and yet more preferably a methoxymethyl group or an ethoxyethyl group.

The hydrocarbyloxy group denoted by $R^4$ to $R^7$ is preferably an alkoxy group, more preferably an alkoxy group having 1 to 3 carbon atoms, and yet more preferably a methoxy group or an ethoxy group.

From the viewpoint of cost and fuel economy being enhanced, one of $R^6$ and $R^7$ is preferably a hydrogen atom. It is more preferable that one of $R^6$ and $R^7$ is a hydrogen atom and the other is an alkyl group or an alkoxy group. It is yet more preferable that one of $R^6$ and $R^7$ is a hydrogen atom and the other is an alkoxy group, and particularly preferably a methoxy group or an ethoxy group.

$R^8$ and $R^9$ in Formula (III) independently denote a group having 1 to 6 carbon atoms, which may have at least one type of atom selected from the atomic group consisting of a nitrogen atom, an oxygen atom, and a silicon atom, $R^8$ and $R^9$ may be bonded so as to form, together with the nitrogen atom, a ring structure, and $R^8$ and $R^9$ may be a single group bonded to the nitrogen via a double bond.

Examples of $R^8$ and $R^9$ in Formula (III) include a hydrocarbyl group having 1 to 6 carbon atoms, a substituted hydrocarbyl group having 1 to 6 carbon atoms, and a substituted silyl group.

Examples of the hydrocarbyl group denoted by $R^8$ and $R^9$ include an alkyl group such as a methyl group, an ethyl group, an n-propyl group, an isopropyl group, an n-butyl group, a sec-butyl group, a tert-butyl group, an n-pentyl group, a neopentyl group, an isopentyl group, or an n-hexyl group; a cycloalkyl group such as a cyclohexyl group; and a phenyl group.

As the substituted hydrocarbyl group denoted by $R^8$ and $R^9$ there can be cited a substituted hydrocarbyl group having as a substituent at least one type of group selected from the group consisting of a nitrogen atom-containing group, an oxygen atom-containing group, and a silicon atom-containing group. Examples of the group having a nitrogen atom-containing group as a substituent include a dialkylaminoalkyl group such as a dimethylaminoethyl group or a diethylaminoethyl group. Examples of the group having an oxygen atom-containing group as a substituent include an alkoxyalkyl group such as a methoxymethyl group, a methoxyethyl group, an ethoxymethyl group, or an ethoxyethyl group; an alkylene oxide group such as an epoxy group or a tetrahydrofuranyl group; and an alkylene oxide alkyl group such as a glycidyl group or a tetrahydrofurfuryl group. Examples of a group having a silicon atom-containing group as a substituent include a trialkylsilylalkyl group such as a trimethylsilylmethyl group.

In the present specification, an alkylene oxide group denotes a monovalent group formed by removing a hydrogen atom from the ring of a cyclic ether compound. The alkylene oxide alkyl group denotes a group formed by replacing at least one hydrogen atom of an alkyl group by an alkylene oxide group.

Examples of the substituted silyl group denoted by $R^8$ and $R^9$ include a trialkylsilyl group such as a trimethylsilyl group, a triethylsilyl group, or a t-butyldimethylsilyl group; and a trialkoxysilyl group such as trimethoxysilyl group.

As a group in which $R^8$ and $R^9$ are bonded, a divalent group having 2 to 12 carbon atoms, which may have at least one type of atom selected from the atomic group consisting of a nitrogen atom, an oxygen atom, and a silicon atom, can be cited. Examples thereof include an alkylene group such as a trimethylene group, a tetramethylene group, a pentamethylene group, or a hexamethylene group; an oxydialkylene group such as an oxydiethylene group or an oxydipropylene group; and a nitrogen-containing group such as a group represented by —$CH_2CH_2$—NH—$CH_2$— or a group represented by —$CH_2CH_2$—N=CH—.

The group in which $R^8$ and $R^9$ are bonded is preferably a nitrogen-containing group, and more preferably a group represented by —$CH_2CH_2$—NH—$CH_2$— or a group represented by —$CH_2CH_2$—N=CH—.

As the single group denoted by $R^8$ and $R^9$ that is bonded to the nitrogen via a double bond there can be cited a divalent group having 2 to 12 carbon atoms, which may have at least one type of atom selected from the atomic group consisting of a nitrogen atom, an oxygen atom, and a silicon atom. Examples thereof include an ethylidene group, a 1-methylpropylidene group, a 1,3-dimethylbutylidene group, a 1-methylethylidene group, and a 4-N,N-dimethylaminobenzylidene group.

The hydrocarbyl group denoted by $R^8$ and $R^9$ is preferably an alkyl group, more preferably an alkyl group having 1 to 4 carbon atoms, yet more preferably a methyl group, an ethyl group, an n-propyl group, or an n-butyl group, and still more preferably a methyl group or an ethyl group. The substituted hydrocarbyl group denoted by $R^8$ and $R^9$ is preferably an alkoxyalkyl group, an alkylene oxide group, or an alkylene oxide alkyl group. The substituted silyl group denoted by $R^8$ and $R^9$ is preferably a trialkylsilyl group or a trialkoxysilyl group, more preferably a trialkylsilyl group, and yet more preferably a trimethylsilyl group or a triethylsilyl group.

$R^8$ and $R^9$ are preferably alkyl groups, alkoxyalkyl groups, substituted silyl groups, or a nitrogen-containing group in which $R^8$ and $R^9$ are bonded, more preferably alkyl groups having 1 to 4 carbon atoms, yet more preferably methyl groups, ethyl groups, n-propyl groups, or n-butyl groups, and still more preferably methyl groups or ethyl groups.

Examples of amino groups in which $R^8$ and $R^9$ are bonded to the nitrogen atom include an acyclic amino group and a cyclic amino group.

Examples of the acyclic amino group include a dialkylamino group such as a dimethylamino group, a diethylamino group, a di(n-propyl)amino group, a di(isopropyl)amino group, a di(n-butyl)amino group, a di(sec-butyl)amino group, a di(tert-butyl)amino group, a di(neopentyl)amino group, or an ethylmethylamino group; a di(alkoxyalkyl)amino group such as a di(methoxymethyl)amino group, a di(methoxyethyl)amino group, a di(ethoxymethyl)amino group, or a di(ethoxyethyl)amino group; and a di(trialkylsilyl)amino group such as a di(trimethylsilyl)amino group or a di(t-butyldimethylsilyl)amino group. Further examples thereof include a di(alkylene oxide) amino group such as di(epoxy) amino group or a di(tetrahydrofuranyl)amino group; and a di(alkylene oxide alkyl)amino group such as a di(glycidyl) amino group or a di(tetrahydrofurfuryl)amino group. Yet further examples thereof include an ethylideneamino group, a 1-methylpropylideneamino group, a 1,3-dimethylbutylideneamino group, a 1-methylethylideneamino group, and a 4-N,N-dimethylaminobenzylideneamino group.

Examples of the cyclic amino group include a 1-polymethyleneimino group such as a 1-pyrrolidinyl group, a 1-piperidino group, a 1-hexamethyleneimino group, a 1-heptamethyleneimino group, a 1-octamethyleneimino group, a 1-decamethyleneimino group, or a 1-dodecamethyleneimino group. Furthermore, examples of the cyclic amino group also include a 1-imidazolyl group, a 4,5-dihydro-1-imidazolyl group, a 1-imidazolidinyl group, a 1-piperazinyl group, and a morpholino group.

From the viewpoint of fuel economy, and long term stability and ready availability of the compound, the amino group in which $R^8$ and $R^9$ are bonded to the nitrogen atom is preferably an acyclic amino group, more preferably a dialkylamino group, and yet more preferably a dimethylamino group or a diethylamino group.

Examples of the compound of formula (II) include an N,N-dialkyl-substituted carboxylic acid amide dialkyl acetal compound.

Examples of the N,N-dialkyl-substituted carboxylic acid amide dialkyl acetal compound include
N,N-dialkylformamide dialkyl acetals such as
N,N-dimethylformamide dimethyl acetal,
N,N-diethylformamide dimethyl acetal,
N,N-di(n-propyl)formamide dimethyl acetal,
N,N-dimethylformamide diethyl acetal,
N,N-diethylformamide diethyl acetal,
N,N-di(n-propyl)formamide diethyl acetal,
N,N-dimethylformamide ethyl methyl acetal,
N,N-diethylformamide ethyl methyl acetal, and
N,N-di(n-propyl)formamide ethyl methyl acetal;
N,N-dialkylacetamide dialkyl acetals such as
N,N-dimethylacetamide dimethyl acetal,
N,N-diethylacetamide dimethyl acetal,
N,N-di(n-propyl)acetamide dimethyl acetal,
N,N-dimethylacetamide diethyl acetal,
N,N-diethylacetamide diethyl acetal,
N,N-di(n-propyl)acetamide diethyl acetal,
N,N-dimethylacetamide ethyl methyl acetal,
N,N-diethylacetamide ethyl methyl acetal, and
N,N-di(n-propyl)acetamide ethyl methyl acetal; and
N,N-dialkylpropionamide dialkyl acetals such as
N,N-dimethylpropionamide dimethyl acetal,
N,N-diethylpropionamide dimethyl acetal,
N,N-di(n-propyl)propionamide dimethyl acetal,
N,N-dimethylpropionamide diethyl acetal,
N,N-diethylpropionamide diethyl acetal,
N,N-di(n-propyl)propionamide diethyl acetal,
N,N-dimethylpropionamide ethyl methyl acetal,
N,N-diethylpropionamide ethyl methyl acetal, and
N,N-di(n-propyl)propionamide ethyl methyl acetal.

Among them, from the viewpoint of fuel economy being enhanced, an N,N-dialkylformamide dialkyl acetal is preferable, and N,N-dimethylformamide dimethyl acetal, N,N-diethylformamide dimethyl acetal, N,N-dimethylformamide diethyl acetal, and N,N-diethylformamide diethyl acetal are more preferable.

The conjugated diene polymer of the present invention may further comprise, in addition to the conjugated diene-based constituent unit (conjugated diene unit), a constituent unit based on another monomer. Examples of said other monomer include an aromatic vinyl, a vinylnitrile, and an unsaturated carboxylic acid ester. Examples of the aromatic vinyl include styrene, α-methylstyrene, vinyltoluene, vinylnaphthalene, divinylbenzene, trivinylbenzene, and divinylnaphthalene. Examples of the vinylnitrile include acrylonitrile, and examples of the unsaturated carboxylic acid ester include methyl acrylate, ethyl acrylate, methyl methacrylate, and ethyl methacrylate. Among them, an aromatic vinyl is preferable, and styrene is more preferable.

From the viewpoint of strength the conjugated diene polymer of the present invention preferably contains an aromatic vinyl-based constituent unit (aromatic vinyl unit), and the content of the aromatic vinyl unit, relative to 100% by weight of the total amount of the conjugated diene unit and the aromatic vinyl unit, is preferably not less than 10% by weight (the content of the conjugated diene unit being not more than 90% by weight), and more preferably not less than 15% by weight (the content of the conjugated diene unit being not more than 85% by weight). Furthermore, from the viewpoint of fuel economy, the content of the aromatic vinyl unit is preferably not more than 50% by weight (the content of the conjugated diene unit being not less than 50% by weight), and more preferably not more than 45% by weight (the content of the conjugated diene unit being not less than 55% by weight).

From the viewpoint of strength, the Mooney viscosity $(ML_{1+4})$ of the conjugated diene polymer of the present invention is preferably not less than 10, and more preferably not less than 20. Furthermore, from the viewpoint of processability, it is preferably not more than 200, and more preferably not more than 150. The Mooney viscosity $(ML_{1+4})$ is measured at 100° C. in accordance with JIS K6300 (1994).

From the viewpoint of fuel economy, the vinyl bond content of the conjugated diene polymer of the present invention, with the content of the conjugated diene unit as 100 mol %, is preferably not more than 80 mol %, and more preferably not more than 70 mol %. Furthermore, from the viewpoint of grip properties, it is preferably not less than 10 mol %, more preferably not less than 15 mol %, yet more preferably not less than 20 mol %, and particularly preferably not less than 40 mol %. The vinyl bond content may be obtained by IR spectroscopy from the absorption intensity at around 910 cm$^{-1}$, which is an absorption peak of a vinyl group.

From the viewpoint of fuel economy, the molecular weight distribution of the conjugated diene polymer of the present invention is preferably 1 to 5, and more preferably 1 to 2. The molecular weight distribution is obtained by measuring number-average molecular weight (Mn) and weight-average molecular weight (Mw) by a gel permeation chromatograph (GPC) method, and dividing Mw by Mn.

A preferred method for producing the conjugated diene polymer of the present invention is a production method comprising the steps A and B:

step A: polymerizing monomers containing a conjugated diene and a vinyl compound of formula (IV) below in a hydrocarbon solvent in the presence of an alkali metal catalyst to produce a polymer having an alkali metal originating from the catalyst at least one terminus of a polymer chain having a conjugated diene-based monomer unit and a monomer unit based on the vinyl compound of formula (IV):

wherein $X^4$, $X^5$, and $X^6$ independently denote a group of formula (IVa) below, a hydrocarbyl group, or a substituted hydrocarbyl group, and at least one of $X^4$, $X^5$, and $X^6$ is a group of formula (IVa):

wherein $R^{10}$ and $R^{11}$ independently denote a hydrocarbyl group having 1 to 6 carbon atoms, a substituted hydrocarbyl group having 1 to 6 carbon atoms, a silyl group, or a substituted silyl group, and $R^{10}$ and $R^{11}$ may be bonded so as to form, together with the nitrogen atom, a ring structure, step B: reacting the resulting polymer in step A with a compound having a linkage of formula (II):

wherein m denotes an integer of 1 to 10, and A denotes a nitrogen atom-containing functional group.

Examples of the alkali metal catalyst that may be used in step A include an alkali metal, an organoalkali metal compound, a complex between an alkali metal and a polar compound, an oligomer having an alkali metal, etc. Examples of the alkali metal include lithium, sodium, potassium, rubidium, and cesium. Examples of the organoalkali metal compound include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, and potassium naphthalenide. Examples of the complex between an alkali metal and a polar compound include a potassium-tetrahydrofuran complex and a potassium-diethoxyethane complex, and examples of the oligomer having an alkali metal include the sodium salt of α-methylstyrene tetramer. Among them, an organolithium compound or an organosodium compound is preferable, and an organolithium compound or organosodium compound having 2 to 20 carbon atoms is more preferable.

The hydrocarbon solvent that may be used in step A is a solvent that does not deactivate the organoalkali metal compound catalyst, and examples thereof include an aliphatic hydrocarbon, an aromatic hydrocarbon, and an alicyclic hydrocarbon. Specific examples of the aliphatic hydrocarbon include propane, n-butane, iso-butane, n-pentane, iso-pentane, n-hexane, propene, 1-butene, iso-butene, trans-2-butene, cis-2-butene, 1-pentene, 2-pentene, 1-hexene, and 2-hexene. Specific examples of the aromatic hydrocarbon include benzene, toluene, xylene, and ethylbenzene, and specific examples of the alicyclic hydrocarbon include cyclopentane and cyclohexane. They may be used on their own or in a combination of two or more types. Among them, a hydrocarbon having 2 to 12 carbon atoms is preferable.

In step A, monomers containing a conjugated diene and a vinyl compound of formula (IV) are polymerized to thus produce a conjugated diene polymer having at a polymer chain terminus an alkali metal originating from the above-mentioned alkali metal catalyst. Examples of the conjugated diene include 1,3-butadiene, isoprene, 1,3-pentadiene, 2,3-dimethyl-1,3-butadiene, and 1,3-hexadiene, and they may be used on their own or in a combination of two or more types. Among them, from the viewpoint of ready availability, 1,3-butadiene and isoprene are preferable.

$X^4$, $X^5$, and $X^6$ in formula (IV) independently denote a group of formula (IVa), a hydrocarbyl group, or a substituted hydrocarbyl group, and at least one of $X^4$, $X^5$, and $X^6$ is a group of formula (IVa).

$R^{10}$ and $R^{11}$ in formula (IVa) independently denote a hydrocarbyl group having 1 to 6 carbon atoms, a substituted hydrocarbyl group having 1 to 6 carbon atoms, a silyl group, or a substituted silyl group, and $R^{10}$ and $R^{11}$ may be bonded so as to form, together with the nitrogen atom, a ring structure.

Examples of the hydrocarbyl group having 1 to 6 carbon atoms denoted by $R^{10}$ and $R^{11}$ include an alkyl group such as a methyl group, an ethyl group, a n-propyl group, an isopropyl group, an n-butyl group, a sec-butyl group, a tert-butyl group, an n-pentyl group, a neopentyl group, an isopentyl group, or an n-hexyl group; a cycloalkyl group such as a cyclohexyl group; and a phenyl group.

Examples of the substituted hydrocarbyl group having 1 to 6 carbon atoms denoted by $R^{10}$ and $R^{11}$ include a substituted hydrocarbyl group having as a substituent at least one type of group selected from the group consisting of a nitrogen atom-containing group, an oxygen atom-containing group, a silicon atom-containing group, etc. Examples of a group having a nitrogen atom-containing group as a substituent include a dialkylaminoalkyl group such as a dimethylaminoethyl group or a diethylaminoethyl group, examples of a group having an oxygen atom-containing group as a substituent include an alkoxyalkyl group such as a methoxymethyl group, a methoxyethyl group, an ethoxymethyl group, or an ethoxyethyl group, and examples of a group having a silicon atom-containing group as a substituent include a trialkylsilylalkyl group such as a trimethylsilylmethyl group.

Examples of the substituted silyl group denoted by $R^{10}$ and $R^{11}$ include a trialkylsilyl group such as a trimethylsilyl group, a triethylsilyl group, or a t-butyldimethylsilyl group.

Examples of the group in which $R^{10}$ and $R^{11}$ are bonded, include a divalent group having 1 to 12 carbon atoms, which may have at least one type of atom selected from the atomic group consisting of a nitrogen atom, an oxygen atom, and a silicon atom. Examples thereof include an alkylene group such as a trimethylene group, a tetramethylene group, a pentamethylene group, or a hexamethylene group; an oxydialkylene group such as an oxydiethylene group or an oxydipropylene group; and a nitrogen-containing group such as a group represented by —CH$_2$CH$_2$—NH—CH$_2$— or a group represented by —CH$_2$CH$_2$—N═CH—.

The group in which $R^{10}$ and $R^{11}$ are bonded is preferably a nitrogen-containing group, and more preferably a group represented by —CH$_2$CH$_2$—NH—CH$_2$— or a group represented by —CH$_2$CH$_2$—N═CH—.

The hydrocarbyl group denoted by $R^{10}$ and $R^{11}$ is preferably an alkyl group, more preferably an alkyl group having 1 to 4 carbon atoms, yet more preferably a methyl group, an ethyl group, an n-propyl group, or an n-butyl group, and particularly preferably an ethyl group or an n-butyl group. The substituted hydrocarbyl group denoted by $R^{10}$ and $R^{11}$ is preferably an alkoxyalkyl group, and more preferably an alkoxyalkyl group having 1 to 4 carbon atoms. The substituted silyl group denoted by $R^{10}$ and $R^{11}$ is preferably a trialkylsilyl group, and more preferably a trimethylsilyl group.

$R^{10}$ and $R^{11}$ are preferably an alkyl group, an alkoxyalkyl group, a substituted silyl group, or a nitrogen-containing group in which $R^{10}$ and $R^{11}$ are bonded, more preferably an alkyl group, yet more preferably an alkyl group having 1 to 4 carbon atoms, and still more preferably a methyl group, an ethyl group, an n-propyl group, or an n-butyl group.

Examples of the group of formula (IVa) include an acyclic amino group and a cyclic amino group.

Examples of the acyclic amino group include a dialkylamino group such as a dimethylamino group, a diethylamino group, a di(n-propyl)amino group, a di(isopropyl)amino group, a di(n-butyl)amino group, a di(sec-butyl)amino group, a di(tert-butyl)amino group, a di(neopentyl)amino group, or an ethylmethylamino group; a di(alkoxyalkyl)amino group such as a di(methoxymethyl)amino group, a di(methoxyethyl)amino group, a di(ethoxymethyl)amino group, or a di(ethoxyethyl)amino group; and a di(trialkylsilyl)amino group such as a di(trimethylsilyl)amino group or a di(t-butyldimethylsilyl)amino group.

Examples of the cyclic amino group include a 1-polymethyleneimino group such as a 1-pyrrolidinyl group, a 1-piperidino group, a 1-hexamethyleneimino group, a 1-heptamethyleneimino group, a 1-octamethyleneimino group, a 1-decamethyleneimino group, or a 1-dodecamethyleneimino group. Further examples of the cyclic amino group include a 1-imidazolyl group, a 4,5-dihydro-1-imidazolyl group, a 1-imidazolidinyl group, a 1-piperazinyl group, and a morpholino group.

From the viewpoint of economy and ready availability, the group of formula (IVa) is preferably an acyclic amino group, more preferably a dialkylamino group, yet more preferably a dialkylamino group substituted with an alkyl group having 1 to 4 carbon atoms, and still more preferably a dimethylamino group, a diethylamino group, a di(n-propyl)amino group, or a di(n-butyl)amino group.

Examples of the hydrocarbyl group denoted by $X^4$ to $X^6$ of Formula (IV) include an alkyl group such as a methyl group, an ethyl group, an n-propyl group, an isopropyl group, an n-butyl group, a sec-butyl group, or a tert-butyl group. Furthermore, examples of the substituted hydrocarbyl group include an alkoxyalkyl group such as a methoxymethyl group, an ethoxymethyl group, a methoxyethyl group, or an ethoxyethyl group.

The hydrocarbyl group denoted by $X^4$ to $X^6$ is preferably an alkyl group, more preferably an alkyl group having 1 to 4 carbon atoms, and yet more preferably a methyl group or an ethyl group. The substituted hydrocarbyl group denoted by $X^4$ to $X^6$ is preferably an alkoxyalkyl group, and more preferably an alkoxyalkyl group having 1 to 4 carbon atoms.

The hydrocarbyl group or substituted hydrocarbyl group denoted by $X^4$ to $X^6$ is preferably an alkyl group or an alkoxyalkyl group, more preferably an alkyl group having 1 to 4 carbon atoms or an alkoxyalkyl group having 1 to 4 carbon atoms, yet more preferably an alkyl group having 1 to 4 carbon atoms, and still more preferably a methyl group or an ethyl group.

At least one of $X^4$, $X^5$, and $X^6$ of Formula (IV) is a group of formula (IVa). It is preferable that two or more of $X^4$, $X^5$, and $X^6$ are groups of formula (IVa), and it is more preferable that two of $X^4$, $X^5$, and $X^6$ are groups of formula (IVa).

Examples of the vinyl compound of formula (IV) used in step A compounds in which one of $X^4$ to $X^6$ is an acyclic amino group of formula (IVa) and two thereof are a hydrocarbyl group or a substituted hydrocarbyl group include a (dialkylamino)dialkylvinylsilane, a {di(trialkylsilyl) amino}dialkylvinylsilane, and a (dialkylamino)dialkoxyalkylvinylsilane.

Examples of the (dialkylamino)dialkylvinylsilane include (dimethylamino)dimethylvinylsilane, (ethylmethylamino) dimethylvinylsilane, (diethylamino)dimethylvinylsilane, (ethyl-n-propylamino)dimethylvinylsilane, (ethylisopropylamino)dimethylvinylsilane, (di(n-propyl)amino)dimethylvinylsilane, (diisopropylamino)dimethylvinylsilane, (n-butyl-n-propylamino)dimethylvinylsilane, (di(n-butyl) amino)dimethylvinylsilane, (dimethylamino)diethylvinylsilane, (ethylmethylamino)diethylvinylsilane, (diethylamino) diethylvinylsilane, (ethyl-n-propylamino)diethylvinylsilane, (ethylisopropylamino)diethylvinylsilane, (di(n-propyl) amino)diethylvinylsilane, (diisopropylamino)diethylvinylsilane, (n-butyl-n-propylamino)diethylvinylsilane, (di(n-butyl)amino)diethylvinylsilane, (dimethylamino) dipropylvinylsilane, (ethylmethylamino) dipropylvinylsilane, (diethylamino)dipropylvinylsilane, (ethyl-n-propylamino)dipropylvinylsilane, (ethylisopropylamino)dipropylvinylsilane, (di(n-propyl)amino)dipropylvinylsilane, (diisopropylamino)dipropylvinylsilane, (n-butyl-n-propylamino)dipropylvinylsilane, (di(n-butyl)amino) dipropylvinylsilane, (dimethylamino)dibutylvinylsilane, (ethylmethylamino)dibutylvinylsilane, (diethylamino)dibutylvinylsilane, (ethyl-n-propylamino)dibutylvinylsilane, (ethylisopropylamino)dibutylvinylsilane, (di(n-propyl) amino)dibutylvinylsilane, (diisopropylamino)dibutylvinylsilane, (n-butyl-n-propylamino)dibutylvinylsilane, and (di(n-butyl)amino)dibutylvinylsilane.

Examples of the {di(trialkylsilyl)amino}dialkylvinylsilane include {di(trimethylsilyl)amino}dimethylvinylsilane, {di(t-butyldimethylsilyl)amino}dimethylvinylsilane, {di(trimethylsilyl)amino}diethylvinylsilane, and {di(t-butyldimethylsilyl)amino}diethylvinylsilane.

Examples of the (dialkylamino)dialkoxyalkylvinylsilane include (dimethylamino)dimethoxymethylvinylsilane, (dimethylamino)dimethoxyethylvinylsilane, (dimethylamino)diethoxymethylvinylsilane, (dimethylamino)diethoxyethylvinylsilane, (diethylamino)dimethoxymethylvinylsilane, (diethylamino)dimethoxyethylvinylsilane, (diethylamino)diethoxymethylvinylsilane, and (diethylamino)diethoxyethylvinylsilane.

Examples of the compound in which two of $X^4$ to $X^6$ are acyclic amino groups of formula (IVa) and one thereof is a hydrocarbyl group or a substituted hydrocarbyl group include a bis(dialkylamino)alkylvinylsilane, a bis{di(trialkylsilyl)amino}alkylvinylsilane, a bis(dialkylamino)alkoxyalkylvinylsilane, etc.

Examples of the bis(dialkylamino)alkylvinylsilane include bis(dimethylamino)methylvinylsilane, bis(ethylmethylamino)methylvinylsilane, bis(diethylamino)methylvinylsilane, bis(ethyl-n-propylamino)methylvinylsilane, bis(ethylisopropylamino)methylvinylsilane, bis(di(n-propyl)amino)methylvinylsilane, bis(diisopropylamino)methylvinylsilane, bis(n-butyl-n-propylamino)methylvinylsilane, bis(di(n-butyl)amino)methylvinylsilane, bis(dimethylamino)ethylvinylsilane, bis(ethylmethylamino)ethylvinylsilane, bis(diethylamino)ethylvinylsilane, bis(ethyl-n-propylamino)ethylvinylsilane, bis(ethylisopropylamino)ethylvinylsilane, bis(di(n-propyl)amino)ethylvinylsilane, bis(diisopropylamino)ethylvinylsilane, bis(n-butyl-n-propylamino)ethylvinylsilane, bis(di(n-butyl)amino)ethylvinylsilane, bis(dimethylamino)propylvinylsilane, bis(ethylmethylamino)propylvinylsilane, bis(diethylamino)propylvinylsilane, bis(ethyl-n-propylamino)propylvinylsilane, bis(ethylisopropylamino)propylvinylsilane, bis(di(n-propyl)amino)propylvinylsilane, bis(diisopropylamino)propylvinylsilane, bis(n-butyl-n-propylamino)propylvinylsilane, bis(di(n-butyl)amino)propylvinylsilane, bis(dimethylamino)butylvinylsilane, bis(ethylmethylamino)butylvinylsilane, bis(diethylamino)butylvinylsilane, bis(ethyl-n-propylamino)butylvinylsilane, bis(ethylisopropylamino)butylvinylsilane, bis(di(n-propyl)amino)butylvinylsilane, bis(diisopropylamino)butylvinylsilane, bis(n-butyl-n-propylamino)butylvinylsilane, and bis(di(n-butyl)amino)butylvinylsilane.

Examples of the bis{di(trialkylsilyl)amino}alkylvinylsilane include bis{di(trimethylsilyl)amino}methylvinylsilane, bis{di(t-butyldimethylsilyl)amino}methylvinylsilane, bis{di(trimethylsilyl)amino}ethylvinylsilane, and bis{di(t-butyldimethylsilyl)amino}ethylvinylsilane.

Examples of the bis(dialkylamino)alkoxyalkylvinylsilane include bis(dimethylamino)methoxymethylvinylsilane, bis(dimethylamino)methoxyethylvinylsilane, bis(dimethylamino)ethoxymethylvinylsilane, bis(dimethylamino)ethoxyethylvinylsilane, bis(diethylamino)methoxymethylvinylsilane, bis(diethylamino)methoxyethylvinylsilane, bis(diethylamino)ethoxymethylvinylsilane, and bis(diethylamino)ethoxyethylvinylsilane.

Examples of the compounds in which three of $X^4$ to $X^6$ are acyclic amino groups of formula (IVa) include a tri(dialkylamino)vinylsilane, etc. Examples thereof include tri(dimethylamino)vinylsilane, tri(ethylmethylamino)vinylsilane, tri(diethylamino)vinylsilane, tri(ethylpropylamino)vinylsilane, tri(dipropylamino)vinylsilane, and tri(butylpropylamino)vinylsilane.

Examples of compounds in which two of $X^4$ to $X^6$ are cyclic amino groups of formula (IVa) and one thereof is a hydrocarbyl group or a substituted hydrocarbyl group include bis(morpholino)methylvinylsilane, bis(piperidino)methylvinylsilane, bis(4,5-dihydroimidazolyl)methylvinylsilane, and bis(hexamethyleneimino)methylvinylsilane.

The vinyl compound of formula (IV) in which two of $X^4$, $X^5$, and $X^6$ are groups of formula (IVa) is preferably a vinyl compound in which two of $X^4$, $X^5$, and $X^6$ are acyclic amino groups; from the viewpoint of fuel economy and grip properties it is more preferably a bis(dialkylamino)alkylvinylsilane, and yet more preferably bis(dimethylamino)methylvinylsilane, bis(diethylamino)methylvinylsilane, bis(di(n-propyl)amino)methylvinylsilane, or bis(di(n-butyl)amino)methylvinylsilane. Among them, from the viewpoint of availability of the compound, bis(diethylamino)methylvinylsilane or bis(di(n-butyl)amino)methylvinylsilane is preferable.

In step A, polymerization may be carried out using the conjugated diene and a vinyl compound of formula (IV) in combination with another monomer. Examples of said other monomer include an aromatic vinyl, a vinylnitrile, and an unsaturated carboxylic acid ester. Specific examples of the aromatic vinyl include styrene, α-methylstyrene, vinyltoluene, vinylnaphthalene, divinylbenzene, trivinylbenzene, and divinylnaphthalene. Specific examples of the vinylnitrile include acrylonitrile, and specific examples of the unsaturated carboxylic acid ester include methyl acrylate, ethyl acrylate, methyl methacrylate, and ethyl methacrylate. Among them, an aromatic vinyl is preferable, and styrene is more preferable.

The polymerization in step A may be carried out in the presence of an agent for regulating the vinyl bond content of the conjugated diene unit, an agent for regulating the distribution in the conjugated diene polymer chain of the conjugated diene unit and a constituent unit based on a monomer other than the conjugated diene (hereafter, generally called 'regulators'), etc. Examples of such agents include an ether compound, a tertiary amine, and a phosphine compound. Specific examples of the ether compound include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Specific examples of the tertiary amine include triethylamine, tripropylamine, tributylamine, N,N,N',N'-tetramethylethylenediamine, N,N-diethylaniline, pyridine, and quinoline. Specific examples of the phosphine compound include trimethylphosphine, triethylphosphine, and triphenylphosphine. They may be used on their own or in a combination of two or more types.

The polymerization temperature in step A is usually 25° C. to 100° C., preferably 35° C. to 90° C., and yet more preferably 50° C. to 80° C. The polymerization time is usually 10 minutes to 5 hours.

In step B, the amount of compound having a linkege of formula (II) that is contacted with the polymer prepared in step A is usually 0.1 to 3 mol per mol of the alkali metal originating from the organoalkali metal catalyst, preferably 0.5 to 2 mol, and more preferably 0.7 to 1.5 mol.

In step B, the temperature at which the polymer prepared in step A and the compound having a linkage of formula (II) are contacted is usually 25° C. to 100° C., preferably 35° C. to 90° C., and yet more preferably 50° C. to 80° C. The contact time is usually 60 sec to 5 hours, and preferably 15 min to 1 hour.

In the production method of the present invention, a coupling agent may be added to the hydrocarbon solution of the conjugated diene polymer as necessary from initiation of polymerization of monomer by an alkali metal catalyst to termination of polymerization. Examples of the coupling agent include a compound of formula (V):

$$R^{12}{}_a ML_{4-a} \qquad (V)$$

wherein $R^{12}$ denotes an alkyl group, an alkenyl group, a cycloalkenyl group, or an aromatic residue, M denotes a silicon atom or a tin atom, L denotes a halogen atom or a hydrocarbyloxy group, and a denotes an integer of 0 to 2.

Here, the aromatic residue denotes a monovalent group in which a hydrogen bonded to an aromatic ring is removed from an aromatic hydrocarbon.

Examples of the coupling agent of formula (V) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

From the viewpoint of processability of the conjugated diene polymer, the amount of coupling agent added is preferably not less than 0.03 mol per mol of the alkali metal originating from the alkali metal catalyst, and more preferably not less than 0.05 mol. Furthermore, from the viewpoint of fuel economy, it is preferably not more than 0.4 mol, and more preferably not more than 0.3 mol.

The conjugated diene polymer may be recovered from the hydrocarbon solution of the conjugated diene polymer by a known recovery method such as, for example, (1) a method in which a coagulant is added to the hydrocarbon solution of the conjugated diene polymer or (2) a method in which steam is added to the hydrocarbon solution of the conjugated diene polymer. The conjugated diene polymer thus recovered may be dried by a known dryer such as a band dryer or an extrusion dryer.

Furthermore, in the method for producing a conjugated diene polymer of the present invention, a treatment in which a group, of formula (Ia), of a polymer is replaced by a hydroxy group by hydrolysis, etc. may be carried out. This treatment may be carried out in a state in which the polymer is on its own or is in a compositional state, as described later.

The conjugated diene polymer of the present invention may be used in a conjugated diene polymer composition by combining another polymer component, an additive, etc. therewith.

Examples of said other polymer component include conventional styrene-butadiene copolymer rubber, polybutadiene rubber, butadiene-isoprene copolymer rubber, and butyl rubber. Examples further include natural rubber, an ethylene-propylene copolymer, and an ethylene-octene copolymer. These polymer components may be used in a combination of two or more types.

In the case where another polymer component is combined with the conjugated diene polymer of the present invention, from the viewpoint of fuel economy, the amount of conjugated diene polymer of the present invention combined, with the total amount of polymer components combined (including the amount of conjugated diene polymer combined) as 100 parts by weight, is preferably not less than 10 parts by weight, and more preferably not less than 20 parts by weight.

As the additive, a known additive may be used, and examples thereof include a vulcanizing agent such as sulfur; a vulcanization accelerator such as a thiazole-based vulcanization accelerator, a thiuram-based vulcanization accelerator, a sulfenamide-based vulcanization accelerator, or a guanidine-based vulcanization accelerator; a vulcanization activator such as stearic acid or zinc oxide; an organic peroxide; a filler such as silica, carbon black, calcium carbonate, talc, alumina, clay, aluminum hydroxide, or mica; a silane coupling agent; an extender oil; a processing aid; an antioxidant; and a lubricant.

Examples of the silica include dry silica (anhydrous silicic acid), wet silica (hydrated silicic acid), colloidal silica, precipitated silica, calcium silicate, and aluminum silicate. One type thereof may be used on its own, or two or more types thereof may be used in combination. The BET specific surface area of the silica is usually 50 to 250 $m^2/g$. The BET specific surface area is measured in accordance with ASTM D1993-03. As a commercial product, product names VN3, AQ, ER, and RS-150 manufactured by Tosoh Silica Corporation, product names Zeosil 1115 MP and 1165 MP manufactured by Rhodia, etc. may be used.

Examples of the carbon black include furnace black, acetylene black, thermal black, channel black, and graphite. With regard to the carbon black, channel carbon black such as EPC, MPC, or CC; furnace carbon black such as SAF, ISAF, HAF, MAF, FEF, SRF, GPF, APF, FF, CF, SCF, or ECF; thermal carbon black such as FT or MT; and acetylene carbon black can be cited as examples. One type thereof may be used or two or more types thereof may be used in combination.

The nitrogen adsorption specific surface area ($N_2SA$) of the carbon black is usually 5 to 200 $m^2/g$, and the dibutyl phthalate (DBP) absorption of the carbon black is usually 5 to 300 mL/100 g. The nitrogen adsorption specific surface area is measured in accordance with ASTM D4820-93, and the DBP absorption is measured in accordance with ASTM D2414-93. As a commercial product, product names SEAST 6, SEAST 7HM, and SEAST KH manufactured by Tokai Carbon Co., Ltd., product names CK 3 and Special Black 4A manufactured by Degussa, Inc., etc. may be used.

Examples of the silane coupling agent include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide, and γ-trimethoxysilylpropylbenzothiazyl tetrasulfide. One type thereof may be used or two or more types thereof may be used in combination. As a commercial product, product names Si69 and Si75 manufactured by Degussa, Inc., etc. may be used.

Examples of the extender oil include an aromatic mineral oil (viscosity-gravity constant (V.G.C. value) 0.900 to 1.049), a naphthenic mineral oil (V.G.C. value 0.850 to 0.899), and a paraffinic mineral oil (V.G.C. value 0.790 to 0.849). The polycyclic aromatic content of the extender oil is preferably less than 3% by weight, and more preferably less than 1% by weight. The polycyclic aromatic content is measured in accordance with British Institute of Petroleum method 346/92. Furthermore, the aromatic compound content (CA) of the extender oil is preferably not less than 20% by weight. Two or more types of extender oils may be used in combination.

Examples of the vulcanization accelerator include thiazole-based vulcanization accelerators such as 2-mercaptobenzothiazole, dibenzothiazyl disulfide, and N-cyclohexyl-2-benzothiazylsulfenamide; thiuram-based vulcanization accelerators such as tetramethylthiuram monosulfide and tetramethylthiuram disulfide; sulfenamide-based vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, diorthotolylguanidine and orthotolylbiguanidine. The amount thereof used is preferably 0.1 to 5 parts by weight relative to 100 parts by weight of rubber component, and more preferably 0.2 to 3 parts by weight.

When a conjugated diene polymer composition is formed by combining a filler with the conjugated diene polymer of the present invention, the amount of filler combined, relative to 100 parts by weight of the conjugated diene polymer of the present invention combined, is usually 10 to 150 parts by weight. From the viewpoint of abrasion resistance and strength, the amount combined is preferably not less than 20 parts by weight, and more preferably not less than 30 parts by weight. From the viewpoint of reinforcement being enhanced, it is preferably not more than 120 parts by weight, and more preferably not more than 100 parts by weight.

When a conjugated diene polymer composition in which a filler is combined with the conjugated diene polymer of the present invention is used, from the viewpoint of fuel economy, it is preferable to use silica as a filler. The amount of silica combined is preferably not less than 50 parts by weight relative to 100 parts by weight of the total amount of fillers combined, and more preferably not less than 70 parts by weight.

As a method for producing a conjugated diene polymer composition by combining another polymer component, an additive, etc. with the conjugated diene polymer of the present invention, a known method such as, for example, a method in which the components are kneaded by means of a known mixer such as a roll or Banbury mixer can be used.

With regard to kneading conditions, when an additive other than a vulcanizing agent or a vulcanization accelerator is combined, the kneading temperature is usually 50° C. to 200° C. and preferably 80° C. to 190° C., and the kneading time is usually 30 sec to 30 min and preferably 1 min to 30 min. When a vulcanizing agent or a vulcanization accelerator is combined, the kneading temperature is usually not more than 100° C., and preferably room temperature to 80° C. A composition in which a vulcanizing agent or a vulcanization accelerator is combined is usually used after carrying out a vulcanization treatment such as press vulcanization. The vulcanization temperature is usually 120° C. to 200° C., and preferably 140° C. to 180° C.

The conjugated diene polymer and the conjugated diene polymer composition of the present invention have excellent fuel economy. The grip properties are also good.

The conjugated diene polymer and the conjugated diene polymer composition of the present invention are used for tires, shoe soles, flooring materials, vibration-proofing materials, etc., and are particularly suitably used for tires.

In accordance with the present invention, there can be provided a conjugated diene polymer that can give a polymer composition having excellent fuel economy, a polymer composition formed by combining the conjugated diene polymer and a filler such as silica, and a method for producing the conjugated diene polymer. The polymer composition has excellent fuel economy. Furthermore, the grip properties are also good.

EXAMPLES

The present invention is explained below by reference to Examples.

Physical properties were evaluated by the following methods.

1. Mooney Viscosity ($ML_{1+4}$)

The Mooney viscosity of a polymer was measured at 100° C. in accordance with JIS K6300 (1994).

2. Vinyl Content (Units: mol %, Proportion of Conjugated Diene-Based 1,2-Addition Constituent Unit)

The vinyl content of a polymer was determined by IR spectroscopy from the absorption intensity at around 910 $cm^{-1}$, which is an absorption peak of a vinyl group.

3. Styrene Unit Content (Units: % by Weight)

The styrene unit content of a polymer was determined from refractive index in accordance with JIS K6383 (1995).

4. Molecular Weight Distribution (Mw/Mn)

Weight-average molecular weight (Mw) and number-average molecular weight (Mn) were measured under conditions (1) to (8) below by a gel permeation chromatograph (GPC) method, and the molecular weight distribution (Mw/Mn) of a polymer was determined.

(1) Instrument: HLC-8020 manufactured by Tosoh Corporation
(2) Separation column: GMH-XL (2 columns in tandem) manufactured by Tosoh Corporation
(3) Measurement temperature: 40° C.
(4) Carrier: tetrahydrofuran
(5) Flow rate: 0.6 mL/min
(6) Amount injected: 5 μL
(7) Detector: differential refractometer
(8) Molecular weight standard: standard polystyrene 5. Fuel Economy A strip-shaped test piece having a width of 1 or 2 mm and a length of 40 mm was stamped out from a sheet-shaped vulcanized molding and used for testing. The loss tangent (tan δ (70° C.)) at 70° C. of the test piece was measured using a viscoelastometer (Ueshima Seisakusho Co., Ltd.) under conditions of a strain of 1% and a frequency of 10 Hz. The smaller this value, the better the fuel economy.

6. Grip Properties

The loss tangent (tan δ (0° C.)) at 0° C. of the vulcanized sheet was measured using a viscoelastometer (Ueshima Seisakusho Co., Ltd.) under conditions of a strain of 0.25% and a frequency of 10 Hz. The greater this value, the better the grip properties.

Example 1

A 20 L capacity stainless polymerization reactor was washed, dried, flushed with dry nitrogen, and charged with 10.2 kg of hexane (specific gravity 0.68 $g/cm^3$), 547 g of 1,3-butadiene, 173 g of styrene, 6.1 mL of tetrahydrofuran, and 5.0 mL of ethylene glycol diethyl ether. Subsequently, 11.5 mmol of bis(diethylamino)methylvinylsilane and 14.1 mmol of n-butyllithium were poured in as a cyclohexane solution and an n-hexane solution respectively, and polymerization was started.

Copolymerization of 1,3-butadiene and styrene was carried out while continuously supplying the monomers to the polymerization reactor at a stirring speed of 130 rpm and a polymerization reactor internal temperature of 65° C. The amount of 1,3-butadiene supplied during the entire polymerization was 821 g, and the amount of styrene supplied was 259 g.

Following this, the polymer solution thus obtained was stirred at a stirring speed of 130 rpm, 11.5 mmol of N,N-dimethylformamide dimethyl acetal was added thereto, and stirring was carried out for 15 minutes. 20 mL of a hexane solution containing 0.54 mL of methanol was added to the polymer solution, and the polymer solution was stirred for a further 5 minutes.

To the polymer solution were added 1.8 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.), and 0.9 g of pentaerythrityl tetrakis(3-laurylthiopropionate) (product name: Sumilizer TP-D, manufactured by Sumitomo Chemical Co., Ltd.). Subsequently, the polymer solution was evaporated at normal temperature for 24 hours, and further dried under vacuum at 55° C. for 12 hours, thus giving a polymer. The amount of constituent unit of formula (I) contained in the polymer thus obtained was 0.00639 mmol/g of polymer per unit weight of polymer. The results of evaluation of the polymer are given in Table 1.

100 parts by weight of the polymer thus obtained, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon black (product name: DIABLACK N339, manufactured by Mitsubishi Chemical Corp.), 47.6 parts by weight of an extender oil (product name: X-140, manufactured by Kyodo Sekiyu), 1.5 parts by weight of an aging inhibitor (product name: Antigene 3C, manufactured by Sumitomo Chemical Co., Ltd.), 2 parts by weight of stearic acid, 2 parts by weight of zinc oxide, 1 part by weight of a vulcanization accelerator (product name: Soxinol CZ, manufactured by Sumitomo Chemical Co., Ltd.), 1 part by weight of a vulcanization accelerator (product name: Soxinol D, manufactured by Sumitomo Chemical Co., Ltd.), 1.5 parts by weight of a wax (product name: Sunnoc N, manufactured by Ouchi Shinko Chemical Industrial Co., Ltd.), and 1.4 parts by weight of sulfur were kneaded by means of a Labo Plastomill to prepare a polymer composition. The polymer composition thus obtained was molded into a sheet using a 6 inch roll, and the sheet was vulcanized by heating at 160° C. for 45 minutes, thus giving a vulcanized sheet. The results of evaluation of the physical properties of the vulcanized sheet are given in Table 1.

Example 2

A 20 L capacity stainless polymerization reactor was washed, dried, flushed with dry nitrogen, and charged with 10.2 kg of hexane (specific gravity 0.68 g/cm$^3$), 547 g of 1,3-butadiene, 173 g of styrene, 6.1 mL of tetrahydrofuran, and 5.0 mL of ethylene glycol diethyl ether.

Subsequently, 14.1 mmol of n-butyllithium was poured in as an n-hexane solution, and copolymerization of 1,3-butadiene and styrene was carried out for 1 hour. During polymerization, the stirring speed was 130 rpm, the polymerization reactor internal temperature was 65° C., and the monomers were supplied continuously to the polymerization reactor.

After the polymerization had been carried out for the 1 hour, 11.0 mmol of bis(diethylamino)methylvinylsilane was charged into the polymerization reactor as a cyclohexane solution under conditions of a stirring speed of 130 rpm and a polymerization reactor internal temperature of 65° C.

Subsequently, the monomers were continuously supplied to the polymerization reactor, thus carrying out copolymerization of 1,3-butadiene and styrene for 0.5 hours. During polymerization, the stirring speed was 130 rpm and the polymerization reactor internal temperature was 65° C.

After the polymerization had been carried out for the 0.5 hours, 11.0 mmol of bis(diethylamino)methylvinylsilane was charged into the polymerization reactor as a cyclohexane solution under conditions of a stirring speed of 130 rpm and a polymerization reactor internal temperature of 65° C.

Subsequently, the monomers were continuously supplied to the polymerization reactor, thus carrying out copolymerization of 1,3-butadiene and styrene for 0.5 hours. During polymerization, the stirring speed was 130 rpm and the polymerization reactor internal temperature was 65° C.

After the polymerization had been carried out for the 0.5 hours, 11.0 mmol of bis(diethylamino)methylvinylsilane was charged into the polymerization reactor as a cyclohexane solution under conditions of a stirring speed of 130 rpm and a polymerization reactor internal temperature of 65° C.

Subsequently, the monomers were continuously supplied to the polymerization reactor, thus carrying out copolymerization of 1,3-butadiene and styrene for 0.5 hours. During polymerization, the stirring speed was 130 rpm and the polymerization reactor internal temperature was 65° C. The amount of 1,3-butadiene supplied during the entire polymerization was 821 g, and the amount of styrene supplied was 259 g.

Following this, the polymer solution thus obtained was stirred at a stirring speed of 130 rpm, 11.0 mmol of N,N-dimethylformamide dimethyl acetal was added thereto, and stirring was carried out for 15 minutes. 20 mL of a hexane solution containing 0.54 mL of methanol was added to the polymer solution, and the polymer solution was stirred for a further 5 minutes.

To the polymer solution were added 1.8 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.), and 0.9 g of pentaerythrityl tetrakis(3-laurylthiopropionate) (product name: Sumilizer TP-D, manufactured by Sumitomo Chemical Co., Ltd.). Subsequently, the polymer solution was evaporated at normal temperature for 24 hours, and further dried under vacuum at 55° C. for 12 hours, thus giving a polymer. The amount of constituent unit of formula (I) contained in the polymer thus obtained was 0.01833 mmol/g of polymer per unit weight of polymer. The results of evaluation of the polymer are given in Table 1.

100 parts by weight of the polymer thus obtained, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon black (product name: DIABLACK N339, manufactured by Mitsubishi Chemical Corp.), 47.6 parts by weight of an extender oil (product name: X-140, manufactured by Kyodo Sekiyu), 1.5 parts by weight of an aging inhibitor (product name: Antigene 3C, manufactured by Sumitomo Chemical Co., Ltd.), 2 parts by weight of stearic acid, 2 parts by weight of zinc oxide, 1 part by weight of a vulcanization accelerator (product name: Soxinol CZ, manufactured by Sumitomo Chemical Co., Ltd.), 1 part by weight of a vulcanization accelerator (product name: Soxinol D, manufactured by Sumitomo Chemical Co., Ltd.), 1.5 parts by weight of a wax (product name: Sunnoc N, manufactured by Ouchi Shinko Chemical Industrial Co., Ltd.), and 1.4 parts by weight of sulfur were kneaded by means of a Labo Plastomill to prepare a polymer composition. The polymer composition thus obtained was molded into a sheet using a 6 inch roll, and the sheet was vulcanized by heating at 160° C. for 45 minutes, thus giving a vulcanized sheet. The results of evaluation of the physical properties of the vulcanized sheet are given in Table 1.

Comparative Example 1

A 5 L capacity stainless polymerization reactor was washed, dried, flushed with dry nitrogen, and charged with 2.55 kg of hexane (specific gravity 0.68 g/cm$^3$), 137 g of 1,3-butadiene, 43 g of styrene, 1.5 mL of tetrahydrofuran, and 1.2 mL of ethylene glycol diethyl ether. Subsequently, an n-hexane solution of 3.6 mmol of n-butyllithium was charged thereinto, and copolymerization of 1,3-butadiene and styrene was carried out for 2.5 hours. During polymerization, the stirring speed was 130 rpm, the polymerization reactor internal temperature was 65° C., and the monomers were supplied continuously to the polymerization reactor. The amount of 1,3-butadiene supplied was 342 g, and the amount of styrene supplied was 108 g.

After the polymerization had been carried out for the 2.5 hours, a solution of 2.8 mmol of bis(diethylamino)methylvinylsilane as a cyclohexane solution was charged into the polymerization reactor under conditions of a stirring speed of 130 rpm and a polymerization reactor internal temperature of 65° C., and stirring was carried out for 30 minutes.

Subsequently, 20 mL of a hexane solution containing 0.14 mL of methanol was charged into the polymerization reactor, and the polymer solution was stirred for 5 minutes.

To the polymer solution were added 1.8 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.), and 0.9 g of pentaerythrityl tetrakis(3-laurylthiopropionate) (product name: Sumilizer TP-D, manufactured by Sumitomo Chemical Co., Ltd.). Subsequently, the polymer solution was evaporated at normal temperature for 24 hours, and further dried under vacuum at 55° C. for 12 hours, thus giving a polymer. The amount of constituent unit of formula (I) contained in the polymer thus obtained was 0.00622 mmol/g of polymer per unit weight of polymer. The results of evaluation of the polymer are given in Table 1.

100 parts by weight of the polymer thus obtained, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon black (product name: DIABLACK N339, manufactured by Mitsubishi Chemical Corp.), 47.6 parts by weight of an extender oil (product name: X-140, manufactured by Kyodo Sekiyu), 1.5 parts by weight of an aging inhibitor (product name: Antigene 3C, manufactured by Sumitomo Chemical Co., Ltd.), 2 parts by weight of stearic acid, 2 parts by weight of zinc oxide, 1 part by weight of a vulcanization accelerator (product name: Soxinol CZ, manufactured by Sumitomo Chemical Co., Ltd.), 1 part by weight of a vulcanization accelerator (product name: Soxinol D, manufactured by Sumitomo Chemical Co., Ltd.), 1.5 parts by weight of a wax (product name: Sunnoc N, manufactured by Ouchi Shinko Chemical Industrial Co., Ltd.), and 1.4 parts by weight of sulfur were kneaded by means of a Labo Plastomill to prepare a polymer composition. The polymer composition thus obtained was molded into a sheet using a 6 inch roll, and the sheet was vulcanized by heating at 160° C. for 45 minutes, thus giving a vulcanized sheet. The results of evaluation of the physical properties of the vulcanized sheet are given in Table 1.

TABLE 1

|  |  | Ex. 1 | Ex. 2 | Comp. Ex. 1 |
|---|---|---|---|---|
| Mooney Viscosity | — | 40 | 51 | 38 |
| Vinyl content | % | 59 | 59 | 59 |
| Styrene unit content | wt % | 25 | 25 | 25 |
| Molecular weight distribution | — | 1.64 | 1.28 | 1.14 |
| Content of the constituent unit of formula (I) | mmol/g (polymer) | 0.00639 | 0.01833 | 0.00622 |
| Fuel economy tan δ (70° C.) | — | 0.126 | 0.105 | 0.197 |
| Grip properties tan δ (0° C.) | — | 1.154 | 1.026 | 0.679 |

The invention claimed is:

1. A conjugated diene polymer comprising a conjugated diene-based constituent unit and a constituent unit of formula (I) below, at least one terminus of the polymer being modified by a compound having a linkage of formula (III) below:

wherein $X^1$, $X^2$, and $X^3$ independently denote a group of formula (Ia) below, a hydroxy group, a hydrocarbyl group, or a substituted hydrocarbyl group, and at least one of $X^1$, $X^2$, and $X^3$ is a group of formula (Ia) below or a hydroxy group,

wherein $R^1$ and $R^2$ independently denote a hydrocarbyl group having 1 to 6 carbon atoms, a substituted hydrocarbyl group having 1 to 6 carbon atoms, a silyl group, or a substituted silyl group, and $R^1$ and $R^2$ may be bonded so as to form, together with the nitrogen atom, a ring structure,

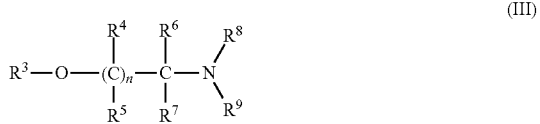

wherein n denotes an integer of 0 to 10, $R^3$ denotes a hydrocarbyl group having 1 to 5 carbon atoms, $R^4$, $R^5$, $R^6$, and $R^7$ independently denote a hydrogen atom, a hydrocarbyl group having 1 to 5 carbon atoms, a substituted hydrocarbyl group having 1 to 5 carbon atoms, or a hydrocarbyloxy group having 1 to 5 carbon atoms, when there are a plurality of $R^4$s and $R^5$s the plurality of $R^4$s and the plurality of $R^5$s may be identical to or different from each other, $R^8$ and $R^9$ independently denote a group having 1 to 6 carbon atoms, which may have at least one type of atom selected from the atomic group consisting of a nitrogen atom, an oxygen atom, and a silicon atom, $R^8$ and $R^9$ may be bonded so as to form, together with the nitrogen atom, a ring structure, and $R^8$ and $R^9$ may be a single group bonded to the nitrogen via a double bond.

2. The polymer according to claim 1, wherein $R^1$ and $R^2$ in Formula (Ia) are hydrocarbyl groups having 1 to 6 carbon atoms.

3. The polymer according to claim 1, wherein two of $X^1$, $X^2$, and $X^3$ of Formula (I) are groups of formula (Ia) or hydroxy groups.

4. The polymer according to claim 1, wherein one of $R^6$ and $R^7$ in formula (III) is a hydrogen atom.

5. The polymer according to claim 1, wherein the vinyl bond content of the conjugated diene polymer, with the content of the conjugated diene-based constituent unit as 100% by mol, is not more than 20 mol % and not more than 70 mol %.

6. A conjugated diene polymer composition comprising the conjugated diene polymer according to claim 1 and a filler.

7. The composition according to claim 6, wherein the content of the filler is 10 to 150 parts by weight per 100 parts by weight of the conjugated diene polymer.

* * * * *